United States Patent
Bond et al.

(10) Patent No.: US 12,405,872 B1
(45) Date of Patent: Sep. 2, 2025

(54) APPLICATION SELF-REPORTING FOR APPLICATION STATUS MONITORING IN ENTERPRISE NETWORKS

(71) Applicant: Wells Fargo Bank, N.A., San Francisco, CA (US)

(72) Inventors: Caleb M Bond, Cottage Grove, MN (US); Lawrence S. Dickerson, Davidson, NC (US); Robert Zamudio, Gilbert, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 489 days.

(21) Appl. No.: 17/492,274

(22) Filed: Oct. 1, 2021

(51) Int. Cl.
*G06F 11/34* (2006.01)
*G06F 11/30* (2006.01)
*G06F 11/32* (2006.01)

(52) U.S. Cl.
CPC ...... *G06F 11/3409* (2013.01); *G06F 11/3006* (2013.01); *G06F 11/3055* (2013.01); *G06F 11/3096* (2013.01); *G06F 11/328* (2013.01)

(58) Field of Classification Search
CPC ............. G06F 11/3409; G06F 11/3006; G06F 11/3055; G06F 11/3096; G06F 11/328
USPC ........................................................ 702/186
See application file for complete search history.

(56) References Cited

U.S. PATENT DOCUMENTS

| | | |
|---|---|---|
| 7,657,545 B2 | 2/2010 | Bird |
| 8,850,402 B2 | 9/2014 | Heisch et al. |
| 9,215,270 B2 | 12/2015 | Mohaban et al. |
| 9,577,900 B1 | 2/2017 | Nataraj et al. |
| 9,590,876 B2 | 3/2017 | Purusothaman |
| 9,983,973 B2 | 5/2018 | Babu et al. |
| 10,193,706 B2 * | 1/2019 | Bhattacharya ...... H04L 41/0806 |
| 10,217,073 B2 | 2/2019 | Kapur et al. |
| 10,447,546 B1 | 10/2019 | Guo et al. |
| 11,269,808 B1 * | 3/2022 | Yuan ..................... G06F 16/172 |

(Continued)

OTHER PUBLICATIONS

Dynatrace, "Application performance monitoring (APM)," Accessed on Mar. 16, 2021 from https://www.dynatrace.com/platform/application-performance-monitoring/, 14 pp.

(Continued)

*Primary Examiner* — Lisa M Caputo
*Assistant Examiner* — Joshua L Forristall
(74) *Attorney, Agent, or Firm* — Shumaker & Sieffert, P.A.

(57) ABSTRACT

A computing device within an enterprise network is described, the computing device configured to execute one or more applications and one or more status modules embedded within the one or more applications. A first status module embedded within a first application running on the computing device is configured to periodically determine an operational status of the first application based on at least one value of at least one metric of the first application for each periodic interval. The at least one metric may be selected from a predefined list of metrics as being indicative of the operational status of the first application. The first status module is configured to report an identifier of the computing device on which the first application is running and a status indicator representative of the operational status of the first application at a given time to an application performance tool within the enterprise network.

21 Claims, 6 Drawing Sheets

(56) References Cited

U.S. PATENT DOCUMENTS

| | | | | |
|---|---|---|---|---|
| 2013/0204911 | A1* | 8/2013 | Chaterjee | G06F 11/1443 |
| | | | | 707/812 |
| 2014/0075094 | A1* | 3/2014 | Alrabady | G11C 16/10 |
| | | | | 711/E12.008 |
| 2015/0288575 | A1* | 10/2015 | Clarke | H04L 43/04 |
| | | | | 709/223 |
| 2015/0301861 | A1* | 10/2015 | LaChiusa | G06F 9/54 |
| | | | | 718/102 |
| 2016/0034919 | A1 | 2/2016 | Borah | |
| 2018/0063075 | A1* | 3/2018 | Eckert | H04L 61/5014 |
| 2018/0314726 | A1* | 11/2018 | Bath | G06F 16/273 |
| 2019/0081976 | A1* | 3/2019 | Kraft | G06F 21/606 |
| 2020/0409825 | A1* | 12/2020 | Balasubramanian | |
| | | | | G06F 11/302 |
| 2022/0303352 | A1* | 9/2022 | Herzog | G06F 18/22 |
| 2023/0016199 | A1* | 1/2023 | Jividen | H04L 41/12 |

OTHER PUBLICATIONS

Flowmon APM, Accessed on Mar. 16, 2021 from https://www.flowmon.com/getattachment/9f967071-607d-43ba-a0e2-896d0d5cac6b/Flowmon-APM.aspx, 7 pp.

Fortinet, "Protecting Enterprises from the Risks of Software-as-a-Service (SaaS)," Accessed on Mar. 15, 2021 from https://www.fortinet.com/content/dam/fortinet/assets/solution-guides/sb-protecting-enterprises-from-the-risks-of-saas.pdf, 4 pp.

* cited by examiner

APPLICATION SELF-REPORTING FOR APPLICATION STATUS MONITORING IN ENTERPRISE NETWORKS

TECHNICAL FIELD

This disclosure relates to computer networks, and more specifically, to monitoring of applications running on computing devices within a network.

BACKGROUND

Enterprise networks, especially large enterprise networks, require significant efforts to maintain and administer. Such networks typically host many different types of applications and systems, each of which may evolve through continual updates, modifications, and bug fixes. In addition, such networks may host multiple different instances of the same application or system (e.g., active-standby instances and/or active-active instances) on the mainframe and/or at multiple geographically-disparate data centers. The continually changing nature of a typical enterprise network and the bandwidth cost required to continually, or even frequently, scan the applications and systems hosted on the enterprise network makes planning and responding to adverse events (e.g., application or data center failures) difficult.

SUMMARY

This disclosure describes an enterprise network including a centralized application performance tool and a plurality of computing devices (e.g., data center servers and/or mainframe computers) configured to execute one or more status modules embedded within one or more applications. A status module embedded within an application is configured to periodically determine an operational status of the application based on at least one value of at least one metric of the application for each periodic interval, and self-report a status indicator representative of the operational status of the application at a given time to the centralized application performance tool. For example, the status module may be configured to determine whether the application is an active instance of a distributed application within the enterprise network based on the at least one metric. In other examples, the status module may be configured to determine whether the application's performance is healthy and/or to compute a composite health score for the application based on one or more metrics. In one example, the status module may self-report the status indicator by recording the status indicator, and in some cases the value of the metric, as a timestamped entry in a dedicated status log file for the application. In this example, the status log file may then be read, packaged for transmission, stored in a central database, or otherwise reported to the centralized application performance tool.

The centralized application performance tool receives the status indicators from one or more of the plurality of applications. In one example, the application performance tool may read or otherwise receive the status log files including the status indicators and the corresponding metric values from the applications. In some examples, the application performance tool may receive the status log files from the applications via a third-party monitoring tool included in the enterprise network. According to the disclosed techniques, the application performance tool may perform comparisons or other analyses of the status indicators and/or the metric values across multiple instances of the same application in order to verify which instance is the active or primary instance and/or which instances are the healthiest. The application performance tool may generate a user interface to display locations (e.g., data center and/or mainframe) and statuses of the plurality of applications running in the enterprise network. The user interface may enable a user, e.g., an administrator of the enterprise network, to view the application statuses from a data center perspective of what applications are running on a certain data center, and/or from an application perspective of where each instance of a given application is running.

The techniques described in this disclosure provide one or more technical advantages and practical applications. For example, available tools for application discovery, including third-party monitoring tools, typically rely on scanning the entire network environment, which adds overhead on application servers and requires network bandwidth. In addition, such scanning tools may only be able to discover which applications are running in the network environment, and not where the applications are running (e.g., data center servers and/or mainframe computers) and/or where the active or primary instance of a distributed application is running. The disclosed status modules comprise lightweight tools (e.g., code modules) that may replace or supplement third-party network monitoring tools to determine location and status of applications running within an enterprise network without the use of bandwidth- and resource-intensive scanning.

In one example, this disclosure is directed to a computing device within an enterprise network, the computing device comprising a storage device configured to store one or more applications and one or more status modules embedded within the one or more applications; and processing circuitry having access to the storage device and configured to execute instructions associated with the one or more status modules embedded within the one or more applications. To execute instructions associated with a first status module embedded within a first application, the processing circuitry is further configured to periodically determine an operational status of the first application based on at least one value of at least one metric of the first application for each periodic interval, wherein the at least one metric is selected as being indicative of the operational status of the first application; and report an identifier of the computing device on which the first application is running and at least a status indicator representative of the operational status of the first application at a given time to an application performance tool within the enterprise network.

In another example, this disclosure is directed to a method comprising periodically determining, by a first status module embedded within a first application of one or more status modules embedded within one or more applications running on a computing device of a plurality of computing devices within an enterprise network, an operational status of the first application based on at least one value of at least one metric of the first application for each periodic interval, wherein the at least one metric is selected as being indicative of the operational status of the first application; and reporting, by the first status module, an identifier of the computing device on which the first application is running and at least a status indicator representative of the operational status of the first application at a given time to an application performance tool within the enterprise network.

In a further example, this disclosure is directed to a network system comprising an application performance tool; and a plurality of computing devices, each computing device configured to execute one or more status modules embedded within one or more applications. Each status module embedded within a respective application running on the respective computing device is configured to periodically determine an operational status of the respective application based on at least one value of at least one metric of the respective application for each periodic interval, wherein the at least one metric is selected as being indicative of the operational status of the respective application, and report an identifier of the respective computing device on which the respective application is running and at least a status indicator representative of the operational status of the respective application at a given time to the application performance tool. The application performance tool is configured to analyze status indicators received from the status modules running on the plurality of computing devices to identify, for a particular application at the given time, a location of a primary instance of the particular application within the network system.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
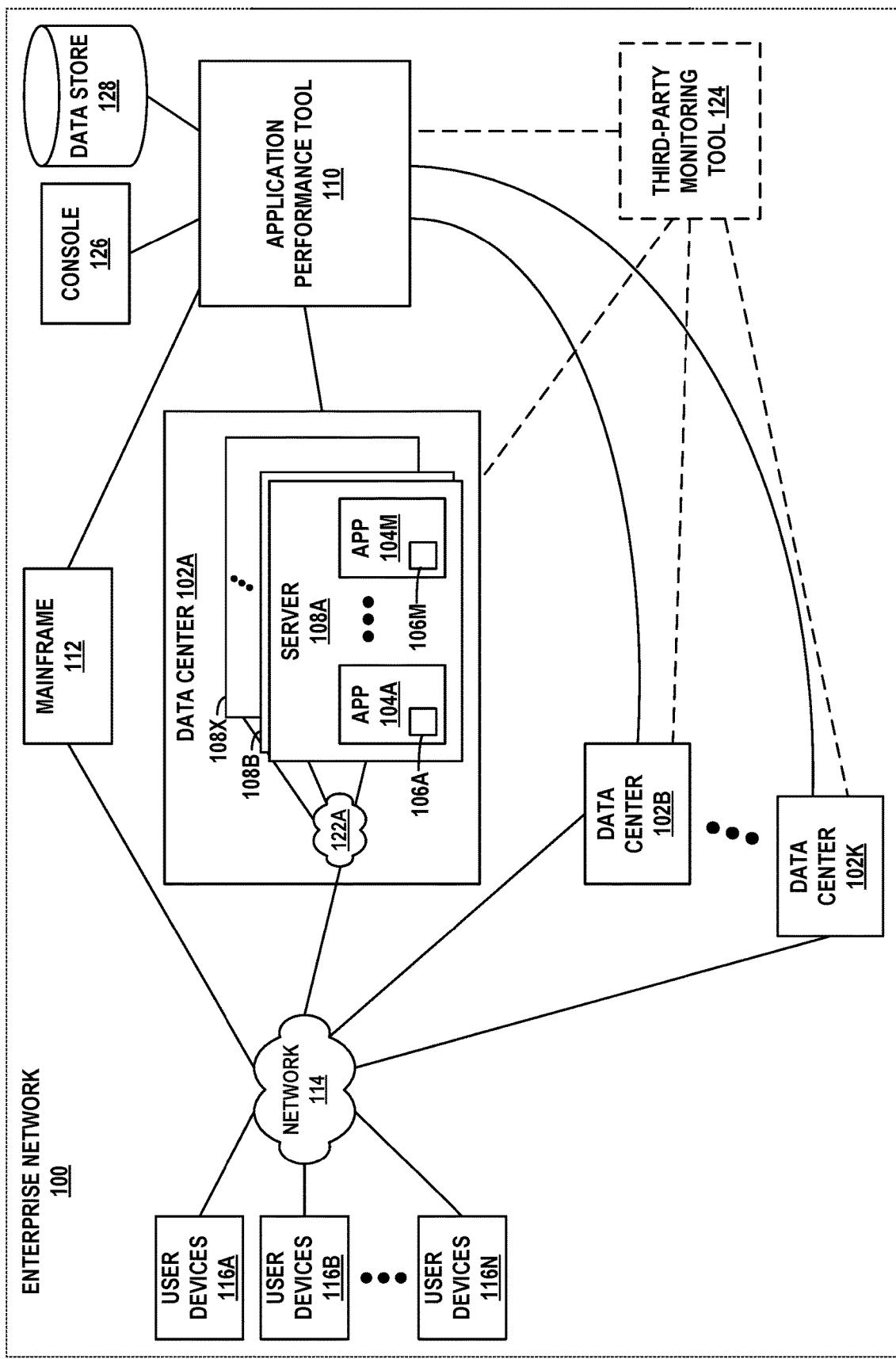
FIG. 1 is a block diagram illustrating an example enterprise network including a centralized application performance tool and a plurality of status modules configured to self-report statuses of respective applications running within the enterprise network, in accordance with one or more aspects of the present disclosure.

FIG. 1 is a block diagram illustrating an example enterprise network 100 including a centralized application performance tool 110 and a plurality of status modules 106A-106M configured to self-report statuses of respective applications 104A-104M running within enterprise network 100, in accordance with one or more aspects of the present disclosure. Enterprise network 100 may be a large-scale enterprise network used or administered by a large organization, such as a financial institution, bank, medical facility, or other type of large organization, which will commonly rely on significant computing resources. For some large organizations, the required computing resources are provided through multiple data centers deployed within the enterprise network.

Accordingly, as illustrated in FIG. 1, enterprise network 100 is generally characterized by multiple data centers 102A-102K (collectively, "data centers 102") and at least one mainframe computer 112. Data centers 102, computing devices within each of data centers 102, and/or mainframe computer 112 may host enterprise applications and provide a platform for execution of applications and services provided to users of user devices 116A-116N (collectively, "user devices 116"). User devices 116 may interact with mainframe 112 through network 114 and may interact with servers within data centers 102 through network 114 and respective data center networks of data centers 102. For ease of illustration, only data center network 122A of data center 102A is illustrated in FIG. 1. It should be understood that each of data centers 102B-102K also include a data center network 122B-122K to interconnect computing devices within the respective data center, for example data center network 122B should be understood to be included within data center 102B and data center network 122K should be understood to be included within data center 102K. One or more client devices 116 may be operated by users of enterprise network 100, and may access functionality of enterprise network 100, generally provided by data centers 102 and/or mainframe 112. In some examples, each of data centers 102 may be located in a geographically-disparate location in order to provide high-speed services to user devices 116 in the same geographic location.

Network 114 illustrated in FIG. 1 may include or represent any public or private communications network or other network. One or more client devices, server devices, or other devices may transmit and receive data, commands, control signals, and/or other information across such networks using any suitable communication techniques. In some examples, network 114 may be a separate network as illustrated in FIG. 1, or one or more of such networks may be a subnetwork of another network. In other examples, two or more of such networks may be combined into a single network; further, one or more of such networks may be, or may be part of, the internet. Accordingly, one or more of the devices or systems illustrated in FIG. 1 may be in a remote location relative to one or more other illustrated devices or systems. Network 114 illustrated in FIG. 1 may include one or more network hubs, network switches, network routers, network links, satellite dishes, or any other network equipment. Such devices or components may be operatively inter-coupled, thereby providing for the exchange of information between computers, devices, or other components (e.g., between one or more user devices or systems and one or more server devices or systems).

In accordance with the disclosed techniques, data center 102A includes one or more computing devices, e.g., servers 108A-108X (collectively, "servers 108"), configured to execute applications 104A-104M (collectively, "applications 104") and status modules 106A-106M (collectively, "status modules 106") embedded within respective applications 104. For ease of illustration, only the applications 104 and status modules 106 within server 108A of data center 102A are illustrated in FIG. 1. It should be understood that each of servers 108B-108X may also execute applications having embedded status modules. In addition, it should be understood that similar sets of computing devices executing applications having embedded status modules may be included within each of data centers 102B-102K. Furthermore, it should be understood that mainframe computer 112 may also be configured to execute applications having embedded status modules similar to those illustrated in server 108A of data center 102A.

Application performance tool 110 may receive interactions from console 126 and may perform functions in response to input received from console 126. Application performance tool 110 also communicates with, and/or has access to, enterprise data store 128. Enterprise data store 128 may represent any suitable data structure or storage medium for storing information related to enterprise network 100 or systems, devices, or applications included within enterprise network 100. In some examples, enterprise data store 128 may represent a system of record associated with an enterprise network 100, which may serve as an authoritative data source for at least some data pertaining to enterprise network 100, or pertaining to the operations of the business, organization, or other entity that administers enterprise network 100.

In some examples, enterprise data store 128 may be updated and/or maintained by application performance tool 110. The information stored in enterprise data store 128 may be searchable and/or categorized such that one or more modules of application performance tool 110 may provide an input requesting information from enterprise data store 128, and in response to the input, receive information stored within enterprise data store 128. Enterprise data store 128 may include one or more application information records and an application metric value store. In some examples, aspects of enterprise data store 128 may be included within application performance tool 110. In other examples, some or all of enterprise data store 128 may be accessed through a separate system.

In operation, application performance tool 110 receives information for an application, e.g., application 104A, that is deployed, stored, and/or executing within one or more data centers 102 and/or mainframe 112. For instance, for an enterprise that has multiple lines of business, each line of business may develop applications for execution on the shared enterprise network 100 (e.g., within one or more of data centers 102 and mainframe 112) used by each line of business within the enterprise. Typically, each such line of business is responsible for maintaining certain information for any applications that are used by that line of business from sunrise of the application (initial development of the application) to sunset of the application (phasing out or shutting down of redundant or obsolete business applications).

For instance, each line of business may maintain, for each application, a list of resources needed by the application for proper performance (e.g., CPU, memory, and other resource requirements). Each line of business may also maintain a list of dependencies (e.g., data required, internal hardware, software, and/or databases required for operation) that the enterprise application relies upon to operate effectively and perform services on behalf of user devices 116. In accordance with the techniques described in this disclosure, each line of business may further maintain guidelines for how the application is to be monitored on a periodic basis. For example, each line of business may maintain which metrics of the enterprise application are indicative of an operational status (e.g., active/inactive, healthy/unhealthy, or a composite health score) of the enterprise application and, in some cases, thresholds and/or ranges of metric values associated with certain operational statuses. Finally, each line of business may also maintain further information about the enterprise application, including how it is deployed, usage patterns (e.g., scheduled or typical operational periods of the enterprise application), and/or historical information. Maintenance of such information may involve creating and updating one or more application information records included within enterprise data store 128 for enterprise network 100 illustrated in FIG. 1.

Application performance tool 110 may receive information about applications from the line of business or other source through console 126, or through another channel or system. As changes, modifications, or updates to enterprise applications are made, application performance tool 110 may receive further information about enterprise application 104A. As the enterprise application evolves during its lifecycle, application performance tool 110 may use such further information to update enterprise data store 128, and may include some or all of such information within the application information records. Accordingly, in some examples, a business or other entity may maintain enterprise data store 128 and keep within enterprise data store 128 up-to-date information about some or all of the many enterprise applications that may execute within data centers 102 and/or mainframe 112.

When enterprise application 104A is deployed and in use, e.g., within server 108A of data center 102A, enterprise application 104A is accessible to one or more of user devices 116 that may request that enterprise application 104A perform services on their behalf. For instance, in one example, one or more of user devices 116 may interact with server 108A executing enterprise application 104A within data center 102A. Enterprise application 104A may receive one or more indications of input that it determines correspond to input from a user of a user device, e.g., user device 116A. In response to the input, enterprise application 104A causes server 108A to perform operations and services on behalf of the user of client device 116A. In addition, enterprise application 104A may log events related to the performance of the operations and services in one or more application logs (not shown in FIG. 1). In some examples, enterprise application 104A may further compute certain metrics based on the logged events over time. For example, enterprise application 104A may continuously or periodically compute metrics including service call volume, service call speed, and/or data write frequency based on activity in application logs, CPU throughput of server 108A, and/or IO (input/output) speed of server 108A.

Large-scale enterprise networks, such as enterprise network 100 illustrated in FIG. 1, typically provide computing resources required to host enterprise applications and provide functionality to user devices through multiple geographically-disparate data centers deployed in the enterprise network. In addition, such enterprise networks may host multiple different instances of the same application or system (e.g., active-standby instances and/or active-active instances) on a mainframe and/or at the multiple geographically-disparate data centers. Available tools for application discovery, e.g., third-party monitoring tool 124, typically rely on scanning the entire network environment, which adds overhead on application servers and requires network bandwidth. In addition, such tools may only be able to discover which applications are running in the network environment, and not where the applications are running (e.g., data center servers and/or mainframe computers) and/or where the active or primary instance of a distributed application is running. The continually changing nature of typical enterprise networks and the bandwidth cost required to continually, or even frequently, scan the applications and systems hosted on the enterprise network makes planning and responding to adverse events (e.g., application or data center failures) difficult.

This disclosure describes status modules 106 as lightweight code modules embedded within respective enterprise applications 104 and configured to self-report statuses of the respective applications 104 running within enterprise network 100. According to the disclosed techniques, a given status module, e.g., status module 106A embedded within application 104A, is configured to periodically determine an operational status of respective application 104A based on at least one value of at least one metric of application 104A for each periodic interval, and self-report a status indicator representative of the operational status of application 104A at a given time to centralized application performance tool 110. Status modules 106 may replace or supplement third-party network monitoring tools, e.g., third-party monitoring tool 124, to determine location and status of applications 104 running within enterprise network 100 without the use of bandwidth- and resource-intensive scanning.

Each of status modules 106 for a given platform, e.g., Java, Windows, etc., may be programmed or configured with a predefined list of metrics, e.g., 3 to 10 different metrics, based on which the status module is able to determine an operational status of applications for the given platform. Since applications, even of the same platform, may vary with respect to types of service calls performed, quantity and frequency of administrative functions, and data logging and storage, the one or more metrics used to determine the operational status of the application may be application-specific. As such, in order to initialize each of status modules 106 to determine the operational status of their respective applications 104, application performance tool 110 may send a message to each of status modules 106 identifying the metric or metrics that are indicative of the operational status of their respective applications 104. In some examples, the message to each status modules 106 may also identify thresholds and/or ranges of metric values associated with certain operational statuses. As noted above, each line of business may maintain metrics and thresholds and/or ranges for each of their applications that are indicative of an operational status and provide that information to application performance tool 110, e.g., via console 124, and/or store that information in application information records within data store 128.

Status module 106A embedded within application 104A is configured to periodically determine the operational status of application 104A based on a value of a selected metric of application 104A for each periodic interval. Status module 106 may select the metric from the predefined list of metrics based on the initialization message received from application performance tool 110 identifying the metric as being indicative of the operational status of application 104A. For example, status module 106A may determine whether application 104A is an active instance of a distributed application within enterprise network 100 based on the selected metric. In other examples, status module 106A may determine whether the performance of application 104A is healthy based on the selected metric. In further examples, status module 106A may compute a composite health score for application 104A based on two or more selected metrics.

Status module 106A may self-report an identifier of server 108A on which application 104A is running and a status indicator representative of the operational status of application 104A at a given time, either periodically or in response to a request. The status indicator may be a one-bit flag, a multi-bit indicator, or a binary representation of a numerical value. In some examples, status module 106A may self-report a single status indicator of application 104A representative of one of: activity or liveness, performance health, or composite health. In other examples, status module 106A may self-report two or more status indicators. For example, status module 106A may transmit the status indicator in a message to application performance tool 110. The message may be a dedicated status reporting message generated by status module 106A or may be an existing reporting message of application 104A onto which the status indicator may be added. As another example, status module 106A may store the status indicator in data store 128 or another central database of enterprise network 100 that is accessible by application performance tool 110. In a further example, status module 106A may provide read access to the status indicator via an interface (e.g., an application programming interface (API)) of application 104A for at least one of application performance tool 110 or third-party monitoring tool 124 within enterprise network 100. In examples where third-party monitoring tool 124 reads the status indicator from application 104A on data center server 108A, third-party monitoring tool 124 may subsequently report the status indicator to application performance tool 110.

In one specific example, status module 106 may self-report the status indicator by recording the status indicator, and in some cases the value of the metric used to determine the operational status of application 104A at each periodic interval, as a timestamped entry in a dedicated status log (not shown in FIG. 1) for application 104A. In this example, status module 106A may self-report the status indicator for application 104A at the given time by packaging the entries in the status log at the given time for transmission, storing the entries of the status log in data store 128, providing read access to the status log file, or otherwise reporting the status log file to centralized application performance tool 110.

Centralized application performance tool 110 receives status indicators for one or more of applications 104 running on server 108A of data center 102, and may further receive status indicators for other enterprise applications running on servers within any of data centers 102 and/or on mainframe computer 112. In one specific example, application performance tool 110 may read or otherwise receive status log files including the status indicators and the corresponding metric values from the applications. In some examples, application performance tool 110 may receive the status indicators for the applications via third-party monitoring tool 124 included in enterprise network 100. According to the disclosed techniques, application performance tool 110 may perform comparisons or other analyses of the status indicators and/or the metric values across multiple instances of the same application in order to verify which instance is the active or primary instance and/or which instances are the healthiest.

In some examples, application performance tool 110 may generate a user interface to display locations (e.g., one of data centers 102 and/or mainframe 112) and statuses of the plurality of applications running in enterprise network 100. The user interface may enable a user, e.g., an administrator of enterprise network 100 via console 126, to view the application statuses from a data center perspective of what applications are running on a certain data center, and/or from an application perspective of where each instance of a given application is running.

In the example of FIG. 1, enterprise network 100 might include all of the components shown in FIG. 1. Further, in some examples, an enterprise network may not include third-party monitoring tool 124. The optional nature of third-party monitoring tool 124 is indicated through the use of a dashed outline and dashed lines connecting third-party monitoring tool 124 to data centers 102 and application performance tool 110.

Each of the computing systems illustrated in FIG. 1 (e.g., application performance tool 110, user devices 116, console 126, data store 128, third-party monitoring tool 124) may represent any suitable computing system, such as one or more server computers, cloud computing systems, mainframes, appliances, desktop computers, laptop computers, mobile devices, and/or any other computing device that may be capable of performing operations in accordance with one or more aspects of the present disclosure. One or more of such devices may perform operations described herein as a result of instructions, stored on a computer-readable storage medium, executing on one or more processors. The instructions may be in the form of software stored on one or more local or remote computer readable storage devices. In other examples, one or more of such computing devices may perform operations using hardware, firmware, or a mixture of hardware, software, and firmware residing in and/or executing at each of such computing devices.

Figure 2:
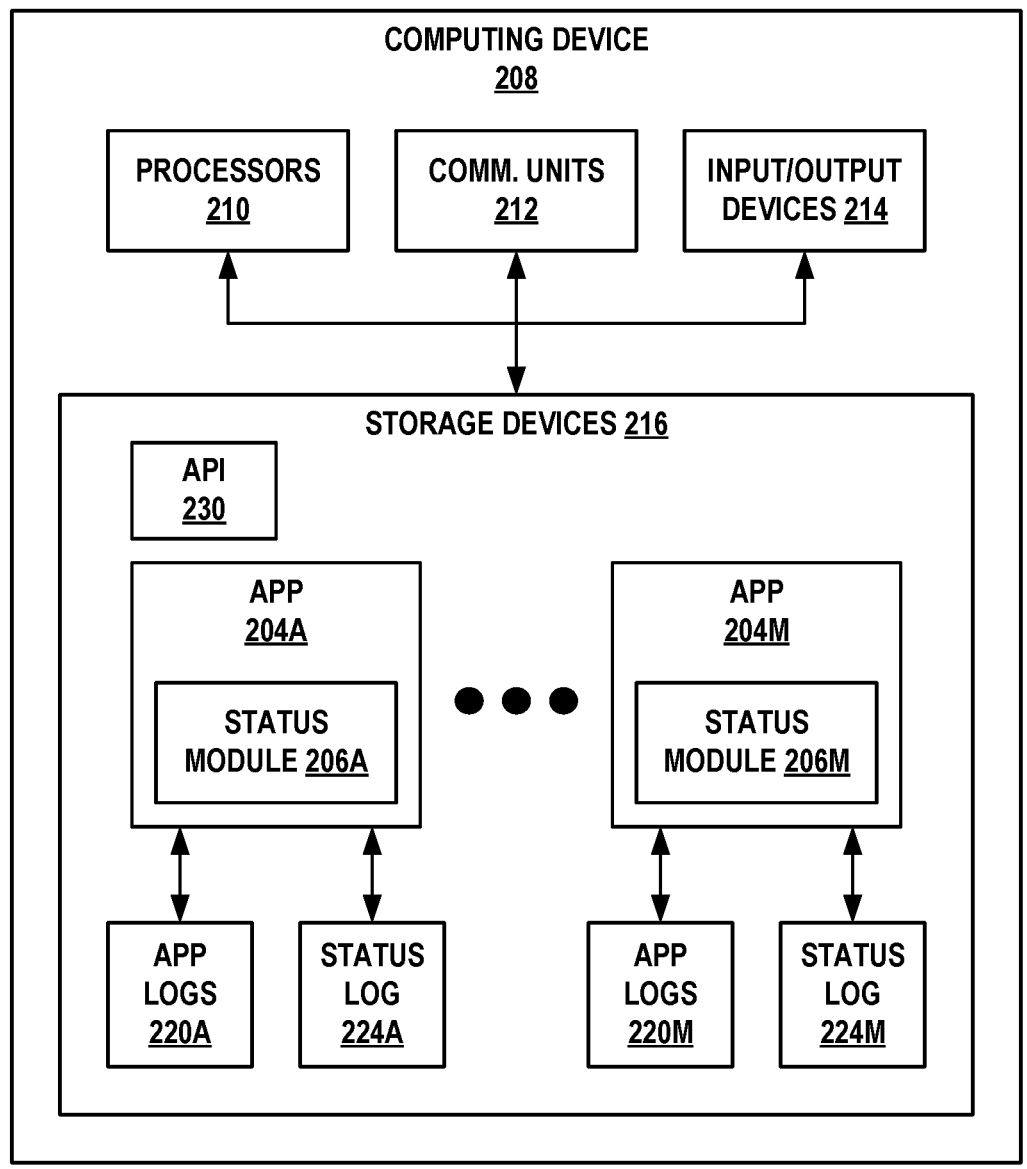
FIG. 2 is a block diagram illustrating an example server device executing applications having embedded status modules configured to self-report application statuses, in accordance with one or more aspects of the present disclosure.

FIG. 2 is a block diagram illustrating an example computing device 208 executing applications 204A-204M (collectively, "applications 204") having embedded status modules 206A-206M (collectively, "status modules 206") configured to self-report application statuses, in accordance with one or more aspects of the present disclosure. Computing device 208 may generally correspond any of servers 108 of data center 102A, other servers within any of data centers 102B-102K, or mainframe computer 112 from FIG. 1. Accordingly, status modules 206 may perform some or all of the same functions described as being performed by status modules 106 from FIG. 1.

Computing device 208 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing device 208 may comprise a server within a data center, cloud computing system, server farm, and/or server cluster (or portion thereof) that provides services to client devices and other devices or systems. For example, computing device 208 may host or provide access to services provided by one or more applications 204 running on computing device 208.

Although computing device 208 of FIG. 2 is illustrated as a stand-alone device, in other examples computing device 208 may be implemented in any of a wide variety of ways, and may be implemented using multiple devices and/or systems. In some examples, computing device 208 may be, or may be part of, any component, device, or system that includes a processor or other suitable computing environment for processing information or executing software instructions and that operates in accordance with one or more aspects of the present disclosure. In some examples, computing device 208 may be fully implemented as hardware in one or more devices or logic elements.

In the example of FIG. 2, computing device 208 may include one or more processors 210, one or more communication units 212, one or more input/output devices 214, and one or more storage devices 216. Storage devices 216 may include applications 204 having embedded status modules 206, application logs 220A-220M (collectively, "application logs 220") corresponding to respective applications 204, status logs 224A-224M (collectively, "status logs 224") corresponding to respective applications 204, and an API 230. One or more of the devices, modules, storage areas, or other components of computing device 208 may be interconnected to enable inter-component communications (physically, communicatively, and/or operatively). In some examples, such connectivity may be provided by through communication channels, a system bus, a network connection, an inter-process communication data structure, or any other method for communicating data. A power source (not shown) is provide power to one or more components of computing device 208. In some examples, the power source may receive power from the primary alternative current (AC) power supply in a commercial building or data center, where some or all of an enterprise network may reside. In other examples, the power source may be or may include a battery.

One or more processors 210 of computing device 208 may implement functionality and/or execute instructions associated with computing device 208 associated with one or more modules illustrated herein and/or described below. One or more processors 210 may be, may be part of, and/or may include processing circuitry that performs operations in accordance with one or more aspects of the present disclosure. Examples of processors 210 include microprocessors, application processors, display controllers, auxiliary processors, one or more sensor hubs, and any other hardware configured to function as a processor, a processing unit, or a processing device. Computing device 208 may use one or more processors 210 to perform operations in accordance with one or more aspects of the present disclosure using software, hardware, firmware, or a mixture of hardware, software, and firmware residing in and/or executing at computing device 208.

One or more communication units 212 of computing device 208 may communicate with devices external to computing device 208 by transmitting and/or receiving data, and may operate, in some respects, as both an input device and an output device. In some examples, communication units 212 may communicate with other devices over a network. In other examples, communication units 212 may send and/or receive radio signals on a radio network such as a cellular radio network. In other examples, communication units 212 of computing device 208 may transmit and/or receive satellite signals on a satellite network such as a Global Positioning System (GPS) network. Examples of communication units 212 include a network interface card (e.g., such as an Ethernet card), an optical transceiver, a radio frequency transceiver, a GPS receiver, or any other type of device that can send and/or receive information. Other examples of communication units 245 may include devices capable of communicating over Bluetooth®, GPS, NFC, ZigBee, and cellular networks (e.g., 3G, 4G, 5G), and Wi-Fi® radios found in mobile devices as well as Universal Serial Bus (USB) controllers and the like. Such communications may adhere to, implement, or abide by appropriate protocols, including Transmission Control Protocol/Internet Protocol (TCP/IP), Ethernet, Bluetooth, NFC, or other technologies or protocols.

One or more input/output devices 214 may represent any input or output devices of computing device 208 not otherwise separately described herein. One or more input/output devices 214 may generate, receive, and/or process input from any type of device capable of detecting input from a human or machine. One or more input/output devices 214 may generate, present, and/or process output through any type of device capable of producing output.

One or more storage devices 216 within computing device 208 may store information for processing during operation of computing device 208. Storage devices 216 may store program instructions and/or data associated with one or more of the modules described in accordance with one or more aspects of this disclosure. One or more processors 210 and one or more storage devices 216 may provide an operating environment or platform for such modules, which may be implemented as software, but may in some examples include any combination of hardware, firmware, and software. One or more processors 210 may execute instructions and one or more storage devices 216 may store instructions and/or data of one or more modules. The combination of processors 210 and storage devices 216 may retrieve, store, and/or execute the instructions and/or data of one or more applications, modules, or software. Processors 210 and/or storage devices 216 may also be operably coupled to one or more other software and/or hardware components, including, but not limited to, one or more of the components of computing device 208 and/or one or more devices or systems illustrated as being connected to computing device 208.

In some examples, one or more storage devices 216 are temporary memories, meaning that a primary purpose of the one or more storage devices is not long-term storage. Storage devices 216 of computing device 208 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art. Storage devices 216, in some examples, also include one or more computer-readable storage media. Storage devices 216 may be configured to store larger amounts of information than volatile memory. Storage devices 216 may further be configured for long-term storage of information as non-volatile memory space and retain information after activate/off cycles. Examples of non-volatile memories include magnetic hard disks, optical discs, floppy disks, Flash memories, or forms of electrically programmable memories (EPROM) or electrically erasable and programmable (EEPROM) memories.

Each of applications 204 may comprise an instance of a different enterprise application developed by a line of business for execution on a shared enterprise network, e.g., enterprise network 100 from FIG. 1. When applications 204 are deployed and in use, in response to receipt of a request from a user device via communication units 212, processors 210 may execute an appropriate one of applications 204, e.g., application 204A, to perform the requested operations and/or services. In addition, application 204A may log events related to the performance of the operations and services in one or more corresponding application logs 220A. In some examples, application 204A may compute certain metrics based on the logged events recorded in application logs 220A over time. For example, application 104A may continuously or periodically compute metrics including service call volume, service call speed, and/or data write frequency based on activity in application logs 220A, CPU throughput of computing device 208, and/or IO speed of computing device 208.

One or more of applications 204 may comprise instances of different distributed applications having multiple instances running in geographically-disparate computing devices (e.g., data center servers or mainframe computers) of the enterprise network. In one example, the distributed applications may have active-standby instances in which one of the instances operates as the active instance that performs operations and services on behalf of user devices while the standby instances remain idle or perform administrative operations. In another example, the distributed applications may have active-active instances in which a primary active instance performs operations and services on behalf of user devices while the other active instances perform the same operations or sync with the primary active instance (e.g., to provide redundancy between the application instances).

As discussed above, the available tools for application discovery and monitoring may only be able to discover which applications are running in a network environment, and not where the applications are running (e.g., data center servers and/or mainframe computers) and/or where the active or primary instance of a distributed application is running. To enable better planning and responsiveness in the case of adverse events within large-scale enterprise networks, this disclosure describes use of status modules 206 embedded in applications 204 that comprise lightweight code modules configured to self-report statuses of the respective applications 204.

According to the disclosed techniques, a given one of status modules 206, e.g., status module 206A embedded within application 204A, is configured to periodically determine an operational status of respective application 204A based on at least one value of at least one metric of application 204A for each periodic interval, and self-report a status indicator representative of the operational status of application 204A at a given time to a centralized application performance tool, e.g., application performance tool 110 from FIG. 1. In some examples, status module 206A is configured to record at least the status indicator for application 204A, and in some cases the value of the metric used to determine the operational status of application 204A for each periodic interval, into a timestamped entry in a status log 224A corresponding to application 204A. Status logs 224 may comprise dedicated status logs corresponding to applications 204.

Each of status modules 206 for a given platform may be programmed or configured with a predefined list of metrics based on which the status module is able to determine an operational status of applications for the given platform. Upon installation of status modules 206 within applications 204, each of status modules 206 may be initialized to determine the operational status of their specific application based on one or more specific metrics selected from the predefined list of metrics. An enterprise data store, e.g., data store 128 of FIG. 1, may maintain which metrics of applications 204 are indicative of an operational status (e.g., active/inactive, healthy/unhealthy, or a composite health score) of each respective application and, in some cases, thresholds and/or ranges of metric values associated with certain operational statuses for each respective application. For example, status module 206A may receive a message from the application performance tool via communication units 212 identifying the metric or metrics that are indicative of the operational status of the specific application 204A. As one example, the message may include a set of binary flags corresponding to the predefined list of metrics in which the flags corresponding to the selected metric or metrics are set. In some examples, the message may also identify thresholds and/or ranges of metric values associated with certain operational statuses. Status module 206A may then select the metric or metrics from the predefined list of metrics based on the initialization message.

Figure 3:
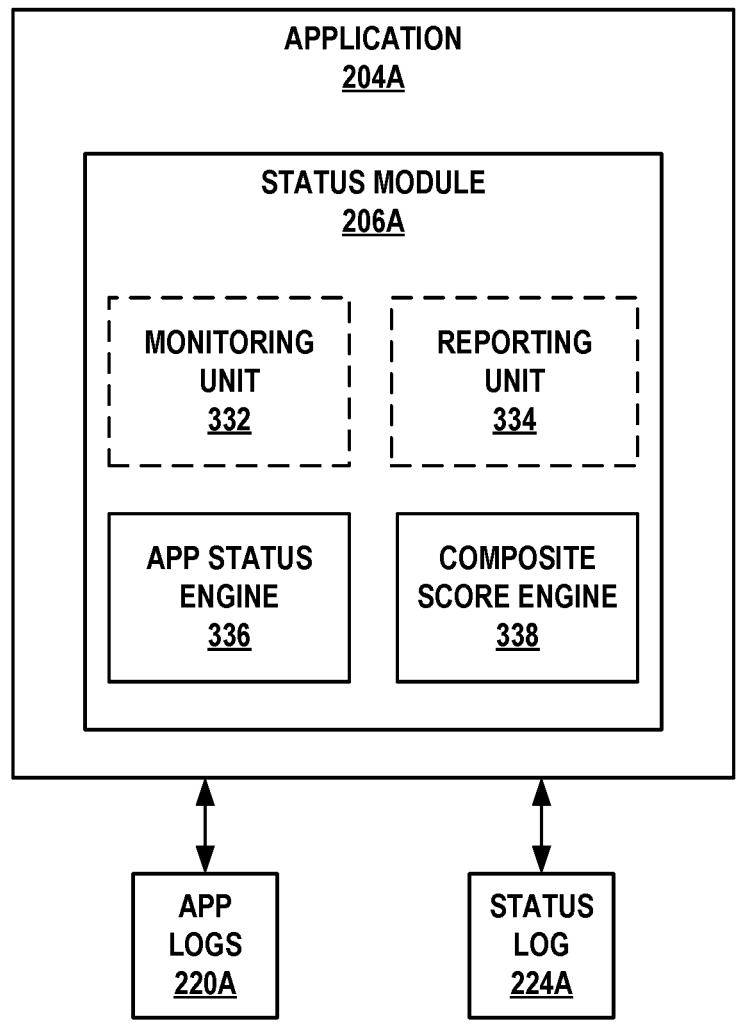
FIG. 3 is a block diagram illustrating an example status module configured to determine an operational status of a respective application based on at least one value of at least one metric and self-report a status indicator for the application, in accordance with one or more aspects of the present disclosure.

FIG. 3 is a block diagram illustrating an example of status module 206A embedded in application 204A from FIG. 2 in further detail. In the illustrated example of FIG. 3, status module 206A includes an application status engine 336, a composite score engine 338, an optional monitoring unit 332, and an optional reporting unit 334.

Upon initialization, status module 206A may periodically determine an operational status of application 204A according to a periodic interval of, e.g., 30 seconds or 1 minute. To determine the operational status, application status engine 336 and/or composite score engine 338 may analyze the selected metric or metrics as recorded in application logs 220A. In examples where application 204A may not already be configured to compute the selected metric or metrics for use by status module 206A, monitoring unit 332 of status module 206A may periodically or continually monitor or compute the selected metric or metrics of application 204A. For example, monitoring unit 332 may be configured to monitor a number of log entries within certain application logs 220A to determine a service call volume metric, monitor a speed at which log entries are being added to certain application logs 220A to determine a service call speed metric, or monitor a frequency with which certain application logs 220A are written to a central database, e.g., enterprise data store 128 from FIG. 1, to determine a data write frequency metric.

Application status engine 336 of status module 206A may be configured to determine an active status of application 204A and/or a health status of application 204A. In some examples, when determining the operational status, in addition to the values of the selected metric or metrics being indicative of the respective statuses of application 204A, application status engine 336 may also take into account whether the selected metric was computed during an operational period of application 204A. In general, application 204A may have certain usage patterns (e.g., scheduled or typical operational periods) that are known to application 204A. It may be beneficial for application status engine 336 to recognize when application 204A is in a non-operational period to avoid incorrectly identifying application 204A as an inactive instance.

In one example, application status engine 336 is configured to determine whether application 204A is an active instance of a distributed application within the enterprise network based on the value of the selected metric for a given periodic interval meeting a predefined threshold value for the metric, and based on the given periodic interval occurring during a scheduled or typical operational period of application 204A. In some examples, the selected metric that is indicative of the activity or liveness of application 204A may be a service call volume metric or a data write frequency metric. As one specific example, application 204A may comprise an instance of a distributed transaction search application that records service calls performed in response to search requests in one of application logs 220A. In this example, a service call volume metric, e.g., determined based on a number of log entries within one of application logs 220A, is indicative of whether application 204A is an active instance of the distributed transaction search application running in the enterprise network. Application status engine 336 may compare a value of the service call volume metric for application 204A to the predefined threshold value of the service call volume metric that is indicative of an active instance. If the value of the service call volume metric was computed during the operational period of application 204A and the value of the service call volume metric meets or exceeds the predefined threshold value, application status engine 336 determines that application 204A is an active instance of the distributed application.

In another example, application status engine 336 may be configured to determine whether the performance of application 204A is healthy based on the value of the metric for the given periodic interval being within a predefined value range for the metric, and based on the given periodic interval occurring during the scheduled or typical operational period of application 104A. In some examples, the selected metric that is indicative of the performance health of application 204A may be a service call speed metric, a CPU throughput metric, and/or an IO speed metric. Application status engine 336 may identify a healthy performance of application 204A based on a value of the selected metric being within a predefined value range because, for example, both a low service call speed and a very high service call speed may be indicative of an anomalous, and thus unhealthy, performance of application 104A.

Composite score engine 338 of status module 206A may be configured to compute a composite health score for application 204A that takes both activity or liveness and performance health into account. For example, composite score engine 338 may be configured to compute a composite health score for application 204A based on two or more values of two or more metrics, and based on the given periodic interval occurring during a scheduled or typical operational period of application 204A. In one example, composite score engine 338 may analyze both a service call volume metric and a service call speed metric of application 104A to compute a numerical value that is indicative of both liveness and performance health of application 204A.

Upon determining the operational status of application 204A for a given periodic interval, application status engine 336 and/or composite score engine 338 may then record a status indicator (e.g., a one-bit flag, a multi-bit indicator, or a binary representation of a numerical value) of application 204A in a timestamped entry in status log 224A. In addition, application status engine 336, composite score engine 338, and/or monitoring unit 332 may record the values of the selected metric or metrics used to determine the operational status of application 204A for each periodic interval within the timestamped entry in status log 224A.

Status module 206A may then self-report an identifier of computing device 208 on which application 204A is running and at least a status indicator representative of the operational status of application 204A at a given time that may be periodic (e.g., every 15 minutes or every hour), or may be upon request (e.g., on demand) from the application performance tool and/or a third-party monitoring tool within the enterprise network. The identifier of computing device 208 may include a location of computing device 208 within the enterprise network, e.g., a URL from a domain name system, a data center name, or a mainframe identifier.

Status module 206A may self-report a single status indicator of application 204A representative of one of: activity or liveness, performance health, or composite health. In other examples, status module 206A may self-report two or more status indicators. In some examples, the reported status indicator may be the most recent status indicator recorded in status log 224A. In other examples, the reported status indicator may include all status indicators and/or all metric values recorded in status log 224A at the given time. In some examples, status log 224A may be limited to hold a relatively small volume of entries and may be configured to overwrite the oldest entries. In this way, even if status module 206A self-reports relatively infrequently (e.g., once per day or once per week), status log 224A will be maintained at a manageable size.

In some examples, status module 206A may perform passive self-reporting in that status module 206A provides read access to the status indicator and/or metric values recorded in status log 224A via API 230 or another interface of computing device 208. In other examples, reporting unit 334 of status module 206A may provide active self-reporting by generating and transmitting a message including the status indicator or writing the status indicator to the central database, e.g., enterprise data store 128 from FIG. 1. For example, reporting unit 334 may generate a packet having a payload of all timestamped entries in status log 224A and having a header including the identifier of computing device 208 on which application 204A is running. Reporting unit 334 may transmit the status indicator, metric values, or the generated packet in a dedicated status reporting message or added onto an existing reporting message between application 204A and the application performance tool. As another example, reporting unit 334 may store the status indicator and/or metric values in the central database of the enterprise network that is accessible by the application performance tool.

Modules illustrated in FIGS. 2 and 3 (e.g., applications 204, status modules 206, application status engine 336, composite score engine 338, monitoring unit 332, and reporting unit 334) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 4:
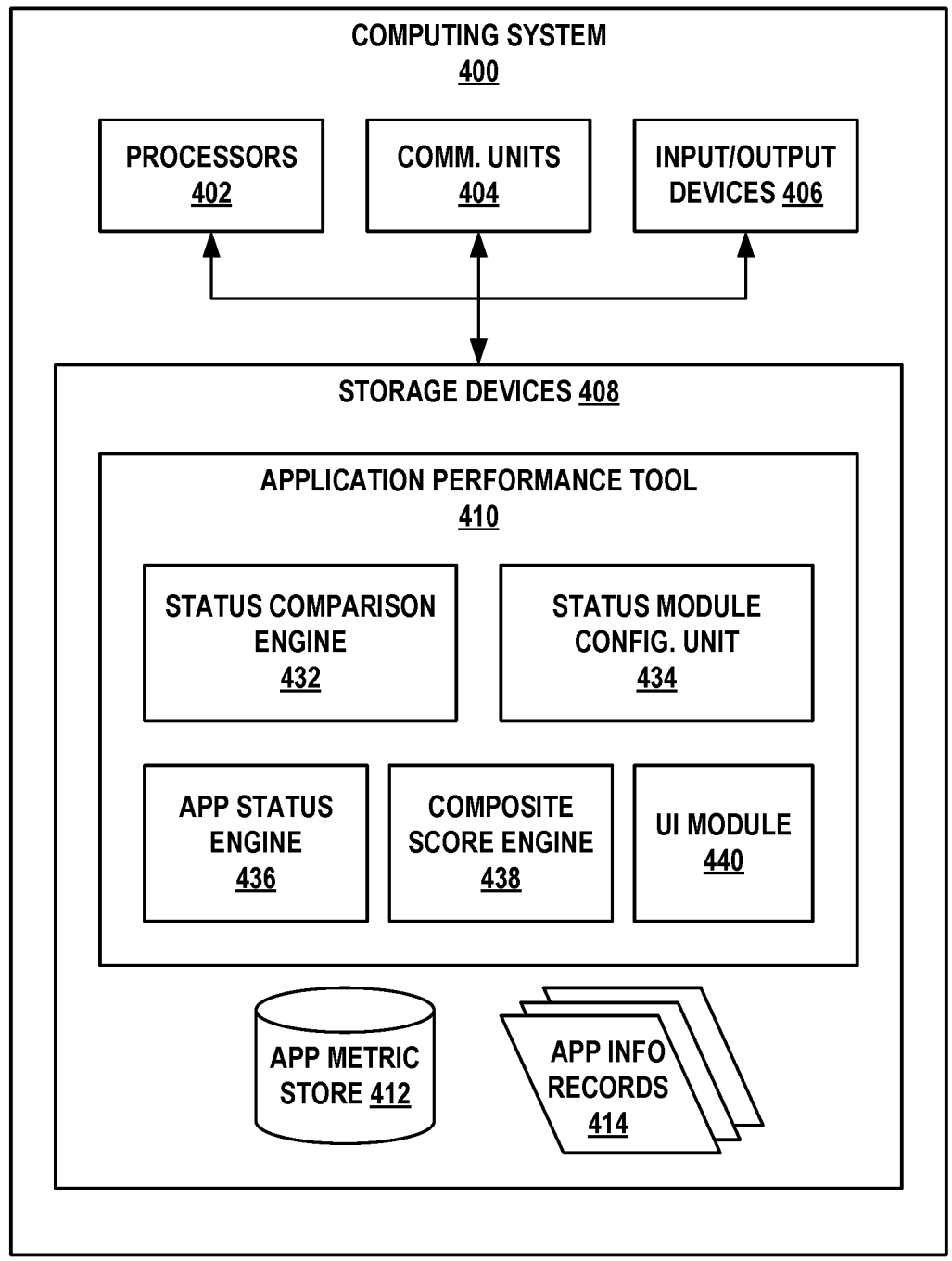
FIG. 4 is a block diagram illustrating an example computing device executing an application performance tool configured to process application statuses received from a plurality of applications, in accordance with one or more aspects of the present disclosure.

FIG. 4 is a block diagram illustrating an example computing system 400 executing an application performance tool 410 configured to process application statuses received from a plurality of applications, in accordance with one or more aspects of the present disclosure. Computing system 400 may generally correspond to a device that includes and/or implements aspects of the functionality of application performance tool 110 illustrated in FIG. 1. Accordingly, computing system 400 executing application performance tool 410 may perform some or all of the same functions described in connection with FIG. 1 as being performed by application performance tool 110.

Computing system 400 may be implemented as any suitable computing system, such as one or more server computers, workstations, mainframes, appliances, cloud computing systems, and/or other computing systems that may be capable of performing operations and/or functions described in accordance with one or more aspects of the present disclosure. In some examples, computing system 400 represents a cloud computing system, server farm, and/or server cluster (or portion thereof) that provides services to client devices and other devices or systems.

Although computing system 400 of FIG. 4 is illustrated as a stand-alone device, in other examples computing system 400 may be implemented in any of a wide variety of ways, and may be implemented using multiple devices and/or systems. In some examples, computing system 400 may be, or may be part of, any component, device, or system that includes a processor or other suitable computing environment for processing information or executing software instructions and that operates in accordance with one or more aspects of the present disclosure. In some examples, computing system 400 may be fully implemented as hardware in one or more devices or logic elements.

In the example of FIG. 4, computing system 400 may include one or more processors 402, one or more communication units 404, one or more input/output devices 406, and one or more storage devices 408. Storage devices 408 may include application performance tool 410 including a status comparison engine 432, a status module configuration unit 434, an application status engine 436, a composite score engine 438, a user interface module 440, an application metric store 412, and one or more application information records 414. One or more of the devices, modules, storage areas, or other components of computing system 400 may be interconnected to enable inter-component communications (physically, communicatively, and/or operatively). In some examples, such connectivity may be provided by through communication channels, a system bus, a network connection, an inter-process communication data structure, or any other method for communicating data. A power source (not shown) is provide power to one or more components of computing system 400. In some examples, the power source may receive power from the primary alternative current (AC) power supply in a commercial building or data center, where some or all of an enterprise network may reside. In other examples, the power source may be or may include a battery.

One or more processors 402 of computing system 400 may implement functionality and/or execute instructions associated with computing system 400 associated with one or more modules illustrated herein and/or described below. One or more processors 402 may be, may be part of, and/or may include processing circuitry that performs operations in accordance with one or more aspects of the present disclosure. Examples of processors 402 include microprocessors, application processors, display controllers, auxiliary processors, one or more sensor hubs, and any other hardware configured to function as a processor, a processing unit, or a processing device. Computing system 400 may use one or more processors 402 to perform operations in accordance with one or more aspects of the present disclosure using software, hardware, firmware, or a mixture of hardware, software, and firmware residing in and/or executing at computing system 400.

One or more communication units 404 of computing system 400 may communicate with devices external to computing system 400 by transmitting and/or receiving data, and may operate, in some respects, as both an input device and an output device. In some examples, communication units 404 may communicate with other devices over a network. In other examples, communication units 404 may send and/or receive radio signals on a radio network such as a cellular radio network. In other examples, communication units 404 of computing system 400 may transmit and/or receive satellite signals on a satellite network such as a GPS network. Examples of communication units 404 include a network interface card (e.g., such as an Ethernet card), an optical transceiver, a radio frequency transceiver, a GPS receiver, or any other type of device that can send and/or receive information. Other examples of communication units 404 may include devices capable of communicating over Bluetooth®, GPS, NFC, ZigBee, and cellular networks (e.g., 3G, 4G, 5G), and Wi-Fi® radios found in mobile devices as well as USB controllers and the like. Such communications may adhere to, implement, or abide by appropriate protocols, including TCP/IP, Ethernet, Bluetooth, NFC, or other technologies or protocols.

One or more input/output devices 406 may represent any input or output devices of computing system 400 not otherwise separately described herein. One or more input/output devices 406 may generate, receive, and/or process input from any type of device capable of detecting input from a human or machine. One or more input/output devices 406 may generate, present, and/or process output through any type of device capable of producing output.

One or more storage devices 408 within computing system 400 may store information for processing during operation of computing system 400. Storage devices 408 may store program instructions and/or data associated with one or more of the modules described in accordance with one or more aspects of this disclosure. One or more processors 402 and one or more storage devices 408 may provide an operating environment or platform for such modules, which may be implemented as software, but may in some examples include any combination of hardware, firmware, and software. One or more processors 402 may execute instructions and one or more storage devices 408 may store instructions and/or data of one or more modules. The combination of processors 402 and storage devices 408 may retrieve, store, and/or execute the instructions and/or data of one or more applications, modules, or software. Processors 402 and/or storage devices 408 may also be operably coupled to one or more other software and/or hardware components, including, but not limited to, one or more of the components of computing system 400 and/or one or more devices or systems illustrated as being connected to computing system 400.

In some examples, one or more storage devices 408 are temporary memories, meaning that a primary purpose of the one or more storage devices is not long-term storage. Storage devices 408 of computing system 400 may be configured for short-term storage of information as volatile memory and therefore not retain stored contents if deactivated. Examples of volatile memories include RAM, DRAM, SRAM, and other forms of volatile memories known in the art. Storage devices 408, in some examples, also include one or more computer-readable storage media. Storage devices 408 may be configured to store larger amounts of information than volatile memory. Storage devices 408 may further be configured for long-term storage of information as non-volatile memory space and retain information after activate/off cycles. Examples of non-volatile memories include magnetic hard disks, optical discs, floppy disks, Flash memories, or forms of EPROM or EEPROM memories.

According to the disclosed techniques, application performance tool 410 of computing system 400 is configured to receive or retrieve status indicators for one or more of applications running on geographically-disparate data center servers and/or mainframe computers within the enterprise network, and analyze the status indicators to identify, for a particular application, a location of a primary instance of the particular application within the enterprise network. In some examples, application performance tool 410 may verify which instance of the particular application is the active or primary instance and/or which instances of the particular application are the healthiest.

As described above, the status modules embedded in each of the applications may be programmed or configured with a predefined list of metrics based on which the status module is able to determine an operational status of applications for the given platform. To initialize the status modules, status module configuration unit 434 of application performance tool 410 may send a message to each of the status modules identifying the at least one metric from the predefined list of metrics that is indicative of the operational status of the respective application. As one example, the message may include a set of binary flags corresponding to the predefined list of metrics in which the flags corresponding to the selected metric or metrics are set. In some examples, the message may also identify thresholds and/or ranges of metric values associated with certain operational statuses.

In some examples, status module configuration unit 434 may perform functions relating to maintaining, updating, and interacting with an enterprise data store, e.g., data store 128 from FIG. 1. Status module configuration unit 434 may maintain application information records 414 within the enterprise data store, and may update application information records 414 and/or the enterprise data store in response to input. For instance, status module configuration unit 434 may receive input from a computing device associated with one or more lines of business. Status module configuration unit 434 may determine that the input corresponds to information about one or more enterprise applications administered, developed, or updated by such lines of business. Status module configuration unit 434 may also receive input from a console, e.g., console 126 from FIG. 1, or from another source. Status module configuration unit 434 may update application information records 414 and/or the enterprise data store as enterprise applications are modified, further developed, or otherwise evolved.

Application information records 414 may represent one or more files, records, or other storage units that include information about any changes, modifications, or updates that are made enterprise applications. Application information records 414 may be primarily maintained by status module configuration unit 434 so that each of application information records 414 includes relatively up-to-date information about its corresponding application; such information may include which metrics of the enterprise applications are indicative of an operational status (e.g., active/inactive, healthy/unhealthy, or a composite health score) of each respective application and, in some cases, thresholds and/or ranges of metric values associated with certain operational statuses for each respective application.

After the status modules are initiated, application performance tool 410 may receive the status indicators, and in some cases the corresponding metric values, for the one or more applications running in the enterprise network via communication unit 404 of computing system 400. In addition, along with each status indicator for a respective application, application performance tool 410 may also receive an identifier of the computing device on which the respective application is running within the enterprise network. The identifier may include a location of the respective computing device within the enterprise network, e.g., a URL from a domain name system, a data center name, or a mainframe identifier.

Application performance tool 410 may receive the status indicators in messages received from the one or more applications. In one specific example, application performance tool 410 may read or otherwise receive status log files including the status indicators and corresponding metric values from one or more of the applications. In some examples, application performance tool 410 may receive the status indicators for the applications via a third-party monitoring tool, e.g., third-party monitoring tool 124, included in the enterprise network. Upon receipt of the status indicators according to the above examples, application performance tool 410 may store the received status indicators in application metric store 412, which may comprise a portion of the enterprise data store. In further examples, the one or more applications may write the status indicators and corresponding metric values directly to application metric store 412 within the enterprise data store, such that application performance tool 410 may simply read the status indicators from application metric store 412.

Status comparison engine 432 of application performance tool 410 may perform comparisons or other analyses of the status indicators and/or the metric values across multiple instances of the same application in order to verify which instance is the active or primary instance and/or which instances are the healthiest. For example, status comparison engine 432 analyzes the status indicators received from the status modules embedded in instances of a particular application running on a plurality of computing devices within the enterprise network to identify the location of the primary instance of the particular application. The location of the primary instance of the particular application may be determined based on the identifier of the computing device on which the primary instance of the particular application is running, where the computing device comprises one of a particular data center server or a particular mainframe computer within the enterprise network.

As one specific example, application performance tool 410 may receive a first status indicator for a first application and a first metric value used to determine a first operational status of the first application, where the first application is a first instance of the particular application running on a first computing device. Application performance tool 410 may also receive a second status indicator for a second application and a second metric value used to determine a second operational status of the second application, where the second application is a second instance of the particular application running on a second computing device. In a scenario where both the first application and the second application are identified as being active instances of the particular application, status comparison engine 432 may determine that the first application is the primary active instance of the particular application based on performing a comparison between the first metric value of the first application and the second metric value of the second application. For example, if both the first application and the second application had metric values that meet the predefined threshold for the selected metric of the particular application, both applications may be indicated as being active instances, but the primary active instance may be identified by status comparison engine 432 as have a higher metric value than other non-primary active instances. In addition, status comparison engine 432 may identify the location of the primary instance of the particular application based on the identifier of the first computing device on which the first application is running.

In some examples, application performance tool 410 includes an application status engine 436 and a composite score engine 438 that may operate substantially similar to application status engine 336 and composite score engine 338 of status module 206A form FIG. 3. For example, application status engine 436 may be configured to determine an active status of the particular application and/or a health status of the particular application based on the metric values received from the particular application. Composite score engine 438 may be configured to compute a composite health score for the particular application that takes both activity or liveness and performance health into account.

As one specific example, application performance tool 410 may receive the status indicator for the particular application and the value of the metric of the particular application used to determine a first operational status of the particular application. Application status engine 436 of application performance tool 410 may determine a second operational status of the particular application based on the received value of the metric of the particular application. Status comparison engine 432 may then verify whether the received status indicator for the particular application is accurate based on performing a comparison between the first operational status and the second operational status of the particular application. In scenarios where the first operational status and the second operational status of the particular application are different, e.g., the status module embedded in the particular application determined that the particular application is an inactive instance and the application status engine 436 of application performance tool 410 determined that the particular application is an active instance, the anomaly may indicate a network issue or configuration issue with the status module of the particular application. In either case, such an anomaly may trigger a notification to an administrator of the enterprise network to investigate the cause of the anomaly.

UI module 440 of application performance tool 110 may generate data representative of a user interface to display on a user interface device, e.g., console 126 of FIG. 1, locations (e.g., data center servers and/or mainframe computers) and statuses of the plurality of applications running in the enterprise network. UI module 440 may present to a user e.g., an administrator of the enterprise network via the user interface device, a view of the application statuses from a data center perspective of what applications are running on a certain data center, and/or from an application perspective of where each instance of a given application is running.

In one example, UI module 440 may generate a graphical user interface (GUI) comprising a searchable and sortable table with rows of applications and columns of locations (e.g., data center servers and mainframes). The table may include color-coded cells to indicate the locations of active instances of the applications. In other examples, the table may include words or symbols in each of the cells to indicate which application instances are active, inactive, or have no presence in each location. In some examples, the table may further include an indication of the health status and/or a numerical value of the composite health score in the corresponding cells for each of the one or more applications. The table may be searchable and sortable by application or by location.

Modules illustrated in FIG. 4 (e.g., status comparison engine 432, status module configuration unit 434, application status engine 436, composite score engine 438, UI module 440) and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

Figure 5:
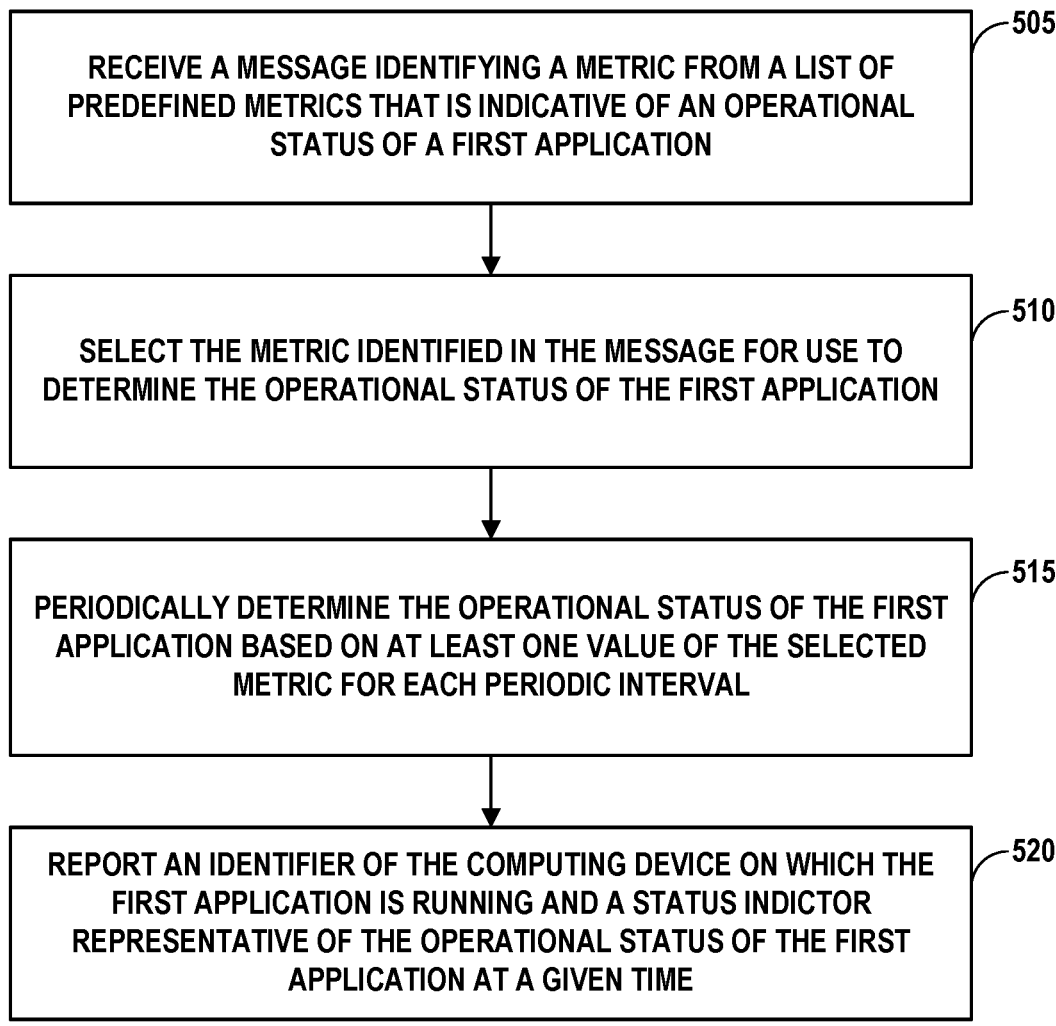
FIG. 5 is a flow diagram illustrating operations performed by an example server executing one or more applications and embedded status modules, in accordance with one or more aspects of the present disclosure.

FIG. 5 is a flow diagram illustrating operations performed by an example computing executing one or more applications and embedded status modules, in accordance with one or more aspects of the present disclosure. The operations of FIG. 5 are described within the context of computing device 208 and status module 206A embedded within application 204A from FIGS. 2 and 3. In other examples, operations described in FIG. 5 may be performed by servers 108 from FIG. 1, or one or more other components, modules, systems, or devices. Further, in other examples, operations described in connection with FIG. 5 may be merged, performed in a difference sequence, or omitted.

Status modules 206 may be configured or programmed with a predefined list of metrics based on which the status modules are able to determine an operational status of applications. For a first status module 206A, computing device 208 may receive a message from an application performance tool, e.g., application performance tool 110 from FIG. 1, identifying at least one metric from the list of predefined metrics that is indicative of the operational status of respective application 204A (505). In some examples, the message may also identify thresholds and/or ranges of metric values associated with certain operational statuses. In response to the message, status module 206A selects the at least one metric identified in the message for use to determine the operational status of first application 204A (510).

Upon initialization, status module 206A periodically determines an operational status of first application 204A based on at least one value of the selected metric of first application 204A for each periodic interval (515). Status module 206A then reports an identifier of computing device 208 on which first application 204A is running and at least a status indicator representative of the operational status of first application 204A at a given time to the application performance tool within the enterprise network (520).

In one specific example, for a given periodic interval, status module 206A determines whether first application 204A comprising an active instance based on the value of the selected metric meeting a predefined threshold value for the selected metric and whether the given periodic interval occurs during an operational period of the first application. Upon determining the operational status of first application 206A for each periodic interval, status module 206A may record the status indicator for first application 204A and the value of the selected metric used to determine the operational status of first application 204A into a timestamped entry in a status log 224A corresponding to first application 204A. Status module 206A may then generating a packet having a payload of all timestamped entries in status log 224A at the given time and having a header including the identifier of computing device 208 on which first application 204A is running, and report the packet to the application performance tool. To report the packet, status module 206A may transmit the packet in a message to the application performance tool, write or store the packet in a central database of the enterprise network, e.g., data store 128 of FIG. 1, that is accessible by the application performance tool, or provide read access to status log 224A via an interface of first application 204A for at least one of the application performance tool or a third-party monitoring tool within the enterprise network.

Figure 6:
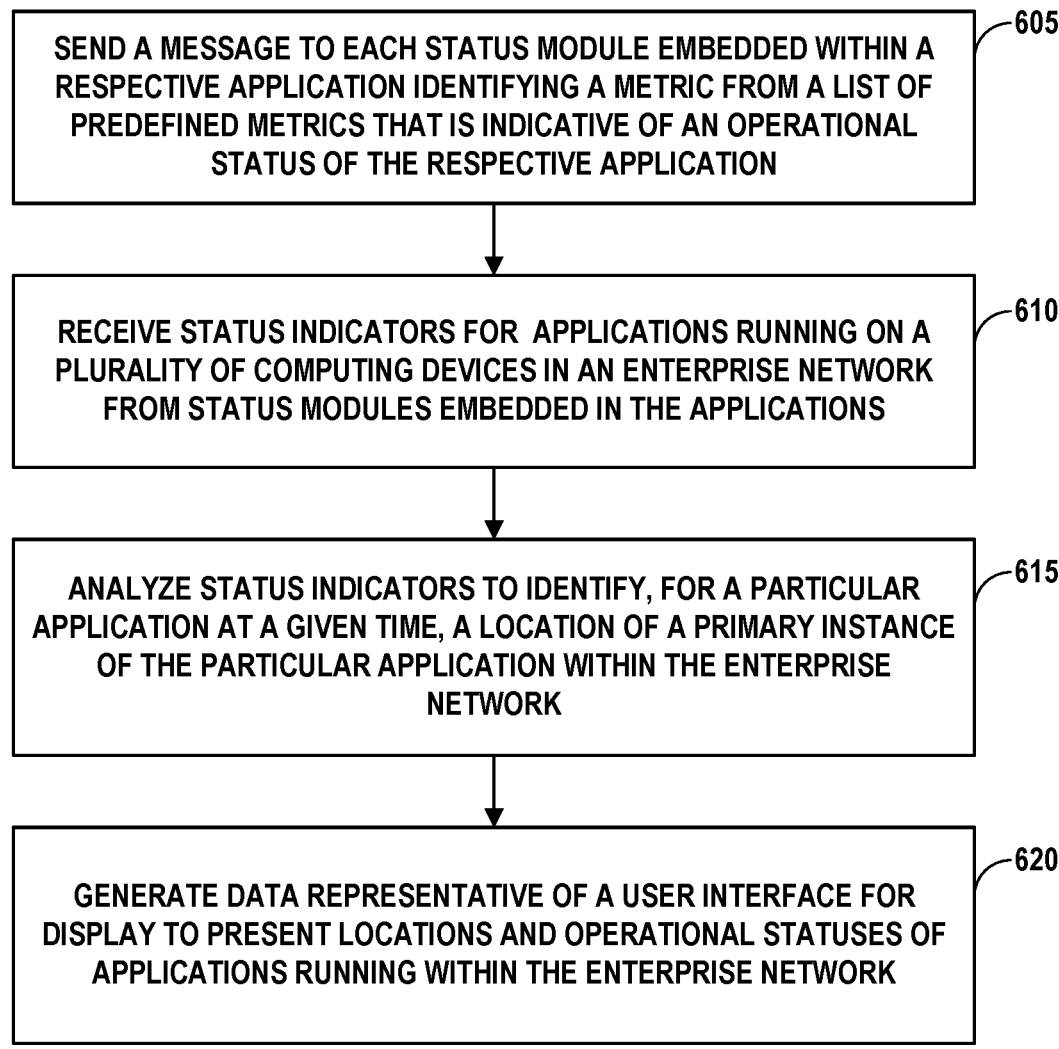
FIG. 6 is a flow diagram illustrating operations performed by an example computing device executing an application performance tool, in accordance with one or more aspects of the present disclosure.

FIG. 6 is a flow diagram illustrating operations performed by an example computing system executing an application performance tool, in accordance with one or more aspects of the present disclosure. The operations of FIG. 6 are described within the context of computing system 400 executing application performance tool 410 from FIG. 4. In other examples, operations described in FIG. 6 may be performed by application performance tool 110 from FIG. 1, or one or more other components, modules, systems, or devices. Further, in other examples, operations described in connection with FIG. 6 may be merged, performed in a difference sequence, or omitted.

In accordance with to the disclosed techniques, status modules embedded in applications may be configured or programmed with a predefined list of metrics based on which the status modules are able to determine an operational status of applications. To initialize the status modules, application performance tool 410 may send a message to each status module embedded within a respective application (e.g., status modules 106 of applications 104 from FIG. 1) identifying at least one metric from the list of predefined metrics that is indicative of the operational status of the respective application (605). In some examples, the message may also identify thresholds and/or ranges of metric values associated with certain operational statuses.

Upon initialization, application performance tool 410 receives status indicators for applications running on a plurality of computing devices (e.g., data center severs and/or mainframe computers) within an enterprise network from status modules embedded in the applications (610). Application performance tool 410 is configured to analyze the received status indicators to identify, for a particular application at a given time, a location of a primary instance of the particular application within the enterprise network (615). The location of the primary instance of the particular application may be determined based on an identifier of the computing device on which the primary instance of the particular application is running that is reported with the status indicators for the particular application. The identifier of the computing device may include, e.g., a URL from a domain name system, a data center name, or a mainframe identifier. Application performance tool 410 may then generate data representative of a user interface for display on a user interface device, e.g., console 126 from FIG. 1, to present locations and operational statuses of the applications running on the plurality of computing devices within the enterprise network (620).

In one example, application performance tool 410 receive a first status indicator for a first application and a first metric value used to determine a first operational status of the first application, the first application comprising a first instance of the particular application running on a first computing device. Application performance tool 410 also receives a second status indicator for a second application and a second metric value used to determine a second operational status of the second application, the second application comprising a second instance of the particular application running on a second computing device. Application performance tool 410 then determines that the first application is the primary instance of the particular application based on performing a comparison between the first metric value of the first application and the second metric value of the second application, and identifies the location of the primary instance of the particular application based on an identifier of the first computing device on which the first application is running.

In another example, application performance tool 410 receives a status indicator for a respective application and a value of the metric of the respective application used to determine a first operational status of the respective application from the status module embedded within the respective application. Application performance tool 410 then determines a second operational status of the respective application based on the received value of the metric of the respective application. Application performance tool 410 verifies whether the received status indicator for the respective application is accurate based on performing a comparison between the first operational status and the second operational status of the respective application. In scenarios where the first operational status and the second operational status do not match, application performance tool 410 may trigger a notification to an administrator of the enterprise network to investigate the cause of the operational status anomaly.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of computer program from one place to another, e.g., according to a communication protocol. In this manner, computer-readable storage media generally may correspond to (1) tangible computer-readable storage media which is non-transitory or (2) a communication media such as signal or carrier wave. Data storage media may be any available media that can be accessed by one or more computers or one or more processing circuits to receive instructs, code and/or data structures for implementation of the techniques described in this disclosure. A computer program product may include a computer-readable medium.

By way of example and not limitation, such computer-readable storage media may include RAM, ROM, EEPROM, CD-ROM, or other optical disk storage, magnetic disk storage, or other magnetic storage devices, flash memory, cache memory, or any other medium that can be used to store desired program code in the form of instructions or store data structures and that can be access by a computer. Also, any connection is a properly termed a computer-readable medium. For example, if instructions are transmitted from a website, server, or other remote source using a coaxial cable, fiber optic cable, twisted pair, digital subscriber line (DSL), or other wireless technologies such as infrared, radio, and microwave, then the coaxial cable, fiber optic cable, twisted pair, DSL, or other wireless technologies such as infrared, radio, and microwave are included in the definition of medium. It should be understood, however, that computer-readable storage media and data storage media do not include connections, carrier waves, signals, or other transient media, but are directed to non-transient, tangible storage media. Disk and disc, as used herein, includes compact disk (CD), laser disc, optical disc, digital versatile disc (DVD), and Blu-ray disc, where disks usually reproduce data magnetically, while discs reproduce data optically with lasers. Combinations of the above should be included within the scope of computer-readable media.

Functionality described in this disclosure may be performed by fixed function and/or programmable processing circuitry. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor", as used herein may refer to any of the foregoing structure of any other structure suitable for implementation of the techniques described herein. In addition, in some aspects, the functionality described herein may be provided within dedicated hardware and/or software modules. Also, the techniques could be fully implemented in one or more circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, an integrated circuit (IC) or a set of ICs (e.g., a chip set). Various components, modules, software systems, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A computing device within an enterprise network, the computing device comprising:
   a storage device configured to store one or more applications and one or more status modules embedded within the one or more applications; and
   processing circuitry having access to the storage device and configured to execute instructions associated with the one or more status modules embedded within the one or more applications, wherein to execute instructions associated with a first status module embedded within a first application, the processing circuitry is further configured to:
      receive, by the first status module from an application performance tool within the enterprise network, a message identifying at least one metric from a predefined list of metrics programmed on each of the one or more status modules as indicative of an operational status of the first application, wherein the operational status includes one of an active status, a health status, or a composite health score, wherein the message includes a set of binary flags that correspond to the predefined list of metrics, and wherein at least one flag corresponding to the at least one metric is set to identify the at least one metric as indicative of the operational status of the first application;
      select, by the first status module, the at least one metric for the first application from the predefined list of metrics based on the message received from the application performance tool;
      periodically determine, by the first status module, the operational status of the first application based on at least one value of the at least one metric of the first application for each periodic interval; and
      report, by the first status module, an identifier of the computing device on which the first application is running and at least a status indicator representative of the operational status of the first application at a given time to the application performance tool within the enterprise network.

2. The computing device of claim 1, wherein the storage device stores one or more status logs corresponding to the one or more applications, and wherein to execute instructions associated with the first status module, the processing circuitry is further configured to, upon determining the operational status of the first application for each periodic interval, record at least the status indicator for the first application into a timestamped entry in a first status log of the one more status logs corresponding to the first application.

3. The computing device of claim 2, wherein to execute instructions associated with the first status module, the processing circuitry is further configured to record the at least one value of the at least one metric used to determine the operational status of the first application for each periodic interval within the timestamped entry along with the status indicator for the first application.

4. The computing device of claim 2, wherein to report at least the status indicator for the first application at the given time, the processing circuitry is further configured to:
   generate a packet having a payload of one or more timestamped entries in the first status log at the given time and having a header including the identifier of the computing device on which the first application is running; and
   report the packet to the application performance tool.

5. The computing device of claim 1, wherein to periodically determine the operational status of the first application, the processing circuitry is further configured to one of periodically or continually monitor the at least one metric of the first application.

6. The computing device of claim 1, wherein the operational status comprises the active status, and wherein to determine the operational status of the first application for a given periodic interval, the processing circuitry is further configured to determine whether the first application is an active instance based on the at least one value of the at least one metric meeting a predefined threshold value for the at least one metric and whether the given periodic interval occurs during an operational period of the first application.

7. The computing device of claim 1, wherein the operational status comprises the health status, and wherein to determine the operational status of the first application for a given periodic interval, the processing circuitry is further configured to determine performance health of the first application based on the at least one value of the at least one metric being within a predefined value range for the at least one metric and whether the given periodic interval occurs during an operational period of the first application.

8. The computing device of claim 1, wherein the operational status comprises the composite health score, and wherein to determine the operational status of the first application for a given periodic interval, the processing circuitry is further configured to determine the composite health score for the first application based on two or more values of two or more metrics and whether the given periodic interval occurs during an operational period of the first application.

9. The computing device of claim 1, wherein to report the status indicator for the first application at the given time, the processing circuitry is further configured to, periodically or in response to a request, at least one of:
   transmit the status indicator in a message to the application performance tool;
   store the status indicator in a central database of the enterprise network that is accessible by the application performance tool; or
   provide read access to the status indicator via an interface of the first application for at least one of the application performance tool or a third-party monitoring tool within the enterprise network.

10. A method comprising:
    receiving, by a first status module embedded within a first application of one or more status modules embedded within one or more applications running on a computing device within an enterprise network and from an application performance tool, a message identifying at least one metric from a predefined list of metrics programmed on each of the one or more status modules as indicative of an operational status of the first application, wherein the operational status includes one of an active status, a health status, or a composite health score, wherein the message includes a set of binary flags that correspond to the predefined list of metrics, and wherein at least one flag corresponding to the at least one metric is set to identify the at least one metric as indicative of the operational status of the first application;

selecting, by the first status module, the at least one metric for the first application from the predefined list of metrics based on the message received from the application performance tool;

periodically determining, by the first status module, the operational status of the first application based on at least one value of the at least one metric of the first application for each periodic interval; and reporting, by the first status module, an identifier of the computing device on which the first application is running and at least a status indicator representative of the operational status of the first application at a given time to the application performance tool within the enterprise network.

11. The method of claim 10, further comprising, upon determining the operational status of the first application for each periodic interval, recording at least the status indicator for the first application into a timestamped entry in a first status log corresponding to the first application.

12. The method of claim 11, further comprising recording the at least one value of the at least one metric used to determine the operational status of the first application for each periodic interval within the timestamped entry along with the status indicator for the first application.

13. The method of claim 11, wherein reporting at least the status indicator for the first application at the given time further comprises:

generating a packet having a payload of one or more timestamped entries in the first status log at the given time and having a header including the identifier of the computing device on which the first application is running; and reporting the packet to the application performance tool.

14. The method of claim 10, wherein the operational status comprises the active status, and wherein determining the operational status of the first application for a given periodic interval comprises determining whether the first application is an active instance based on the value of the metric meeting a predefined threshold value for the metric and whether the given periodic interval occurs during an operational period of the first application.

15. The method of claim 10, wherein reporting the status indicator for the first application at the given time comprises, periodically or in response to a request, at least one of:

transmitting the status indicator in a message to the application performance tool;

storing the status indicator in a central database of the enterprise network that is accessible by the application performance tool; or providing read access to the status indicator via an interface of the first application for at least one of the application performance tool or a third-party monitoring tool within the enterprise network.

16. A network system comprising:
an application performance tool; and
a plurality of computing devices, each computing device configured to execute one or more status modules embedded within one or more instances of a distributed application, wherein each status module embedded within a respective instance of the distributed application running on a respective computing device is configured to:

receive, from the application performance tool, a message identifying at least one metric from a predefined list of metrics programmed on each of the one or more status modules as indicative of an operational status of the respective instance of the distributed application, wherein the operational status includes one of an active status, a health status, or a composite health score, wherein the message includes a set of binary flags that correspond to the predefined list of metrics, and wherein at least one flag corresponding to the at least one metric is set to identify the at least one metric as indicative of the operational status of the first application, periodically determine an operational status of the respective instance of the distributed application based on at least one value of the at least one metric of the respective instance of the distributed application for each periodic interval, and report an identifier of the respective computing device on which the respective instance of the distributed application is running and at least a status indicator representative of the operational status of the respective instance of the distributed application at a given time to the application performance tool, wherein the application performance tool is configured to analyze status indicators received from the status modules running on the plurality of computing devices to identify, for the distributed application at the given time, a location of a primary instance of the distributed application within the network system, wherein the primary instance of the distributed application has a higher value of the at least one metric than other non-primary instances of the distributed application.

17. The network system of claim 16,
wherein the application performance tool is configured to send the message to each of the status modules identifying the at least one metric from the predefined list of metrics that is indicative of the operational status of the respective instance of the distributed application.

18. The network system of claim 16, wherein the location of the primary instance of the distributed application comprises a computing device of the plurality of computing devices within the network system on which the primary instance of the distributed application is running, wherein the computing device comprises one of a data center server or a mainframe computer within the network system.

19. The network system of claim 16, wherein to identify the location of the primary instance of the distributed application at the given time, the application performance tool is configured to:

receive a first status indicator for a first application and a first metric value used to determine a first operational status of the first application, the first application comprising a first instance of the distributed application running on a first computing device;

receive a second status indicator for a second application and a second metric value used to determine a second operational status of the second application, the second application comprising a second instance of the distributed application running on a second computing device;

determine that the first application is the primary instance of the distributed application based on performing a comparison between the first metric value of the first application and the second metric value of the second application, wherein the first application is the primary instance based on the first metric value of the first application having a higher value than the second metric value of the second application; and identifying the location of the primary instance of the distributed application based on an identifier of the first computing device on which the first application is running.

20. The network system of claim 16, wherein the operational status of the respective instance of the distributed application comprises a first operational status of the respective instance of the distributed application, and wherein the application performance tool is configured to:

receive the status indicator for the respective instance of the distributed application and the at least one value of the at least one metric of the respective instance of the distributed application used to determine the first operational status of the respective instance of the distributed application;

determine a second operational status of the respective instance of the distributed application based on the received at least one value of the at least one metric of the respective instance of the distributed application; and verify whether the received status indicator for the respective instance of the distributed application is accurate based on performing a comparison between the first operational status and the second operational status of the respective instance of the distributed application.

21. The network system of claim 16, wherein the application performance tool is configured to generate data representative of a user interface for display on a user interface device to present locations and operational statuses of the one or more instances of the distributed application running on the plurality of computing devices within the network system.

* * * * *